(12) United States Patent
Zink et al.

(10) Patent No.: US 7,857,385 B2
(45) Date of Patent: Dec. 28, 2010

(54) COMPACTIBLE JUVENILE VEHICLE SEAT WITH FORWARD-FOLDING BACKREST AND RETRACTABLE ARMRESTS

(75) Inventors: Paul T. Zink, Indianapolis, IN (US); Andrew B. Mendenhall, Mooresville, IN (US)

(73) Assignee: Cosco Management, Inc., Wilmington, DE (US)

( * ) Notice: Subject to any disclaimer, the term of this patent is extended or adjusted under 35 U.S.C. 154(b) by 210 days.

(21) Appl. No.: 12/036,974

(22) Filed: Feb. 25, 2008

(65) Prior Publication Data
US 2008/0224514 A1  Sep. 18, 2008

Related U.S. Application Data (60) Provisional application No. 60/894,620, filed on Mar. 13, 2007.

(51) Int. Cl.
*B60N 2/28* (2006.01)
*A47D 1/10* (2006.01)

(52) U.S. Cl. ............... 297/256; 297/378.12; 297/250.1

(58) Field of Classification Search ................ 297/255, 297/256, 378.12, 250.1
See application file for complete search history.

(56) References Cited

U.S. PATENT DOCUMENTS

| | | | |
|---|---|---|---|
| 1,641,953 A | 9/1927 | Abraham | |
| 1,742,822 A | 1/1930 | Olson | |
| 3,762,768 A | 10/1973 | Hyde et al. | |
| 4,986,600 A | 1/1991 | Leblanc et al. | |
| 5,121,965 A | 6/1992 | Skold et al. | |
| 5,123,699 A * | 6/1992 | Warburton | ............... 297/219.1 |
| 5,496,092 A | 3/1996 | Williams et al. | |
| 5,499,860 A | 3/1996 | Smith et al. | |
| 5,647,634 A | 7/1997 | Presser et al. | |
| 5,785,383 A | 7/1998 | Otero | |
| 5,803,543 A | 9/1998 | Hartmann | |
| 6,179,362 B1 | 1/2001 | Wisniewski et al. | |
| 6,685,266 B2 * | 2/2004 | James et al. | ......... 297/378.12 X |
| 6,767,058 B2 | 7/2004 | McClellan-Derrickson | |
| 6,773,064 B2 | 8/2004 | Treen et al. | |
| 6,840,577 B2 | 1/2005 | Watkins | |
| 6,908,151 B2 | 6/2005 | Meeker et al. | |
| 6,932,429 B2 | 8/2005 | Kamiki | |
| 7,000,985 B2 | 2/2006 | Belgarde | |
| 2004/0061366 A1 | 4/2004 | Meeker et al. | |
| 2004/0124677 A1 | 7/2004 | Meeker et al. | |
| 2005/0052059 A1 | 3/2005 | Oto | |
| 2005/0186068 A1 | 8/2005 | Coulson et al. | |
| 2005/0264059 A1 | 12/2005 | Clement et al. | |
| 2005/0264065 A1 | 12/2005 | Clement et al. | |
| 2006/0006712 A1 | 1/2006 | Clement et al. | |
| 2006/0012234 A1 | 1/2006 | Collias | |
| 2006/0138823 A1 | 6/2006 | Huang | |
| 2007/0236061 A1 | 10/2007 | Meeker et al. | |

* cited by examiner

*Primary Examiner*—Anthony D Barfield
(74) *Attorney, Agent, or Firm*—Barnes & Thornburg LLP (57) ABSTRACT

A juvenile vehicle seat includes a seat base adapted to set on a vehicle seat and a foldable backrest associated with the seat base. The juvenile vehicle seat also includes a backrest lock coupled to the foldable backrest.

18 Claims, 6 Drawing Sheets

COMPACTIBLE JUVENILE VEHICLE SEAT WITH FORWARD-FOLDING BACKREST AND RETRACTABLE ARMRESTS

This application claims priority under 35 U.S.C. §119(e) to U.S. Provisional Application Ser. No. 60/894,620, filed Mar. 13, 2007, which is expressly incorporated by reference herein.

BACKGROUND

The present disclosure relates to juvenile vehicle seats, and in particular, to vehicle seats having side arms. More particularly, the present disclosure relates to a juvenile vehicle seat having a foldable backrest that moves relative to a seat bottom.

SUMMARY

A compactible juvenile vehicle seat in accordance with the present disclosure includes a stationary seat base, a seat back including a foldable backrest, and movable first and second armrests. The juvenile vehicle seat includes a backrest lock operable by a caregiver to lock the foldable backrest in an unfolded upright use position.

In illustrative embodiments, the juvenile vehicle seat includes first and second backrest locks. The first backrest lock comprises the first armrest and a first backrest anchor. The second backrest lock comprises the second armrest and a second backrest anchor.

Forward movement of the foldable backrest toward a compact folded storage position is blocked by the first and second armrests upon movement of those armrests relative to the seat base to upright backrest-blocking positions. The first backrest anchor is provided to couple the first armrest to the foldable backrest after the first armrest has been moved to assume its backrest-blocking position to retain the foldable backrest in an upright use position. The second backrest anchor is provided to couple the second armrest to the foldable backrest after the second armrest has been moved to assume its backrest-blocking position to help retain the foldable backrest in the upright use position.

The first and second backrest anchors can be operated by a caregiver to decouple the backrest from the first and second armrests. Once decoupled, the caregiver can then move the first and second armrests relative to the seat bottom and away from the foldable backrest to backrest-releasing positions. Then the caregiver can move the foldable backrest relative to the seat bottom to assume a compact folded storage position.

In illustrative embodiments, the compactible juvenile vehicle seat also includes a headrest mounted for up-and-down movement on the foldable backrest and a headrest-height adjustor coupled to the headrest and the foldable backrest. The headrest-height adjustor includes a spring-loaded pivotable latch arm having a finger configured to mate with ratchet teeth provided on the foldable backrest to establish the height of the headrest relative to the foldable backrest.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a juvenile vehicle seat in accordance with a first embodiment of the present disclosure including a seat back having a foldable backrest and a height-adjustable headrest and first and second armrests mounted on a seat base for movement between upright backrest-blocking positions providing a barrier to forward-folding movement of the foldable backrest toward a seat bottom included in the seat base and retracted backrest-releasing positions extending away from the seat bottom and removing an armrest barrier to forward-folding movement of the foldable backrest and showing diagrammatically inclusion in the juvenile vehicle seat of a first backrest lock comprising the first armrest and a first backrest anchor and a second backrest lock comprising the second armrest and a second backrest anchor;

FIG. 2 is an enlarged sectional view taken along line 2-2 of FIG. 1 showing cooperation of a latch retainer coupled to the foldable backrest and a first latch unit comprising a pivot post coupled to the first armrest, a pivotable latch mounted on the pivot post, and a latch-biasing spring to form an illustrative first backrest anchor and showing use of the latch-biasing spring included in the first latch unit to yieldably urge the pivotable latch to assume a locked position (shown in solid) engaging the latch retainer to retain the foldable backrest in an upright use position (as shown in FIG. 1) and suggesting movement of the pivotable latch about the pivot post to assume an unlocked position (shown in phantom) disengaging the latch retainer to allow forward folding movement (in the direction of the double arrow) of the foldable backrest toward a compact folded storage position;

FIG. 4 is an exploded perspective assembly view of the juvenile vehicle seat of FIG. 1 showing a seat base including a seat bottom, pivotable first and second armrests, a disassembled first latch unit associated with the pivotable first armrest, and a disassembled second latch unit associated with the pivotable second armrest and showing a seat back including a foldable backrest, a headrest, a headrest-height adjustor, a movable backrest frame adapted to mate with frame-receiver collars provided along side edges of a back plate included in the foldable backrest, a first latch retainer coupled to one of the frame-receiver collars appended to a right-side edge of the back plate and adapted to mate with the first latch unit as suggested in FIG. 2, and a second latch retainer coupled to one of the frame-receiver collars appended to a left-side edge of the back plate and adapted to mate with the second latch unit;

DETAILED DESCRIPTION

Figure 1:
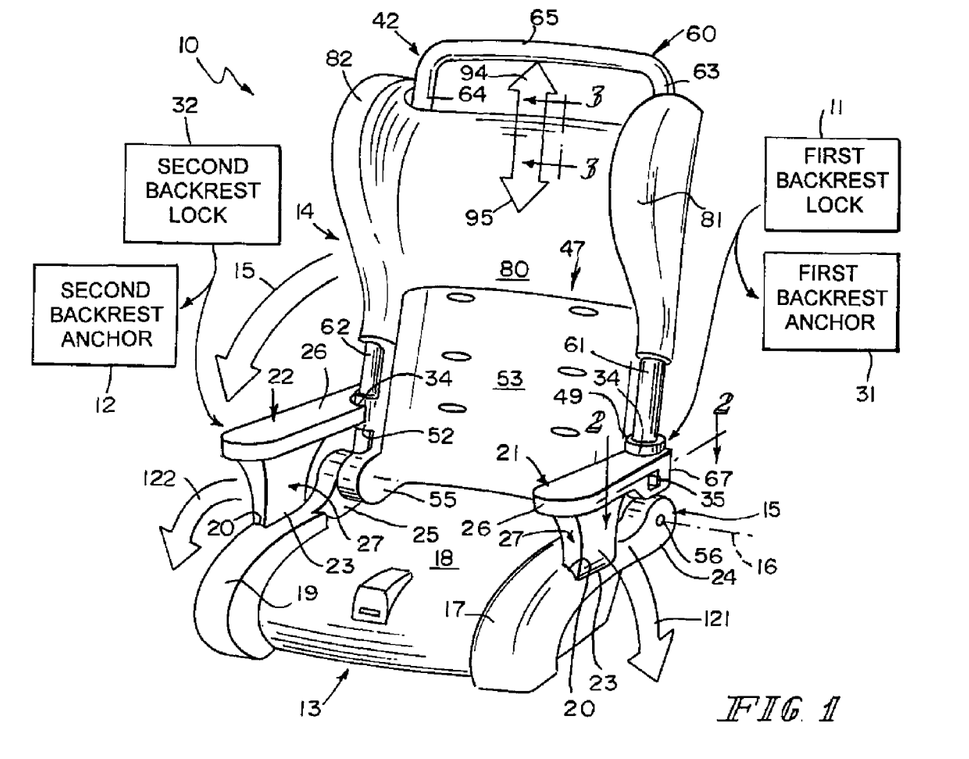
FIG. 1A is a perspective view of the compactible juvenile vehicle seat of FIG. 1 after the foldable backrest has been released in response to pivoting movement of the first and second armrests away from one another and folded forwardly to assume a compact folded storage position lying above the seat bottom.
Figure 1A:
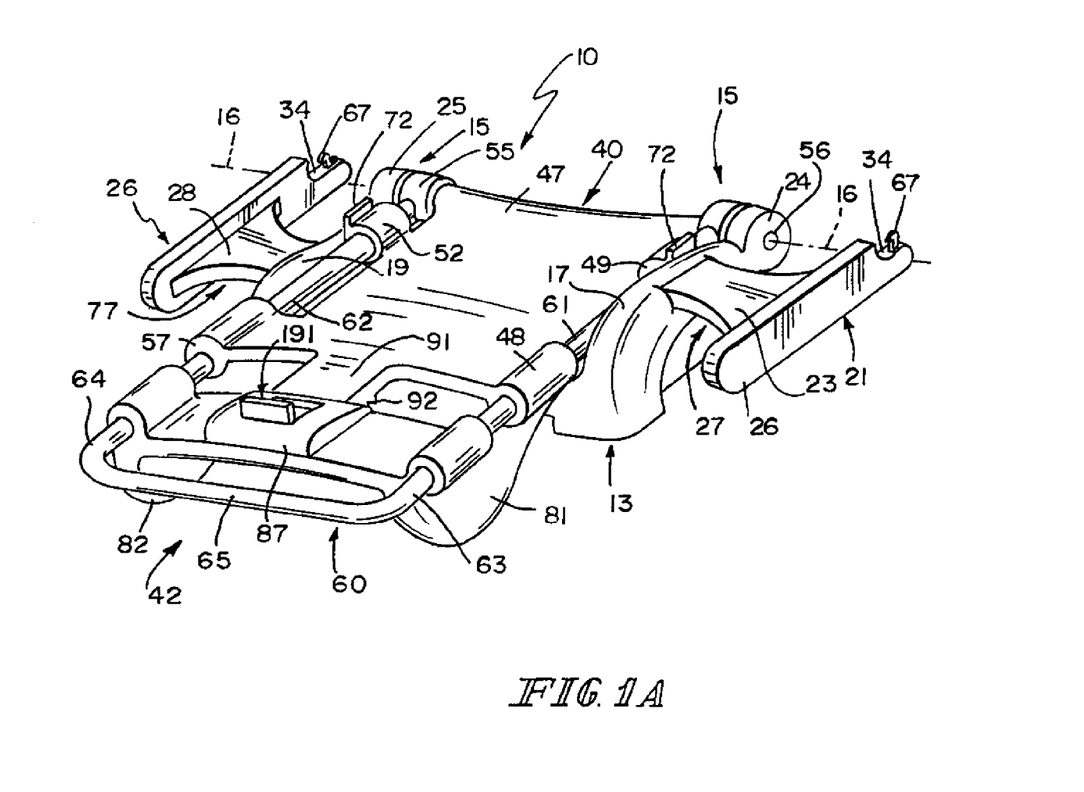
Figure 3:
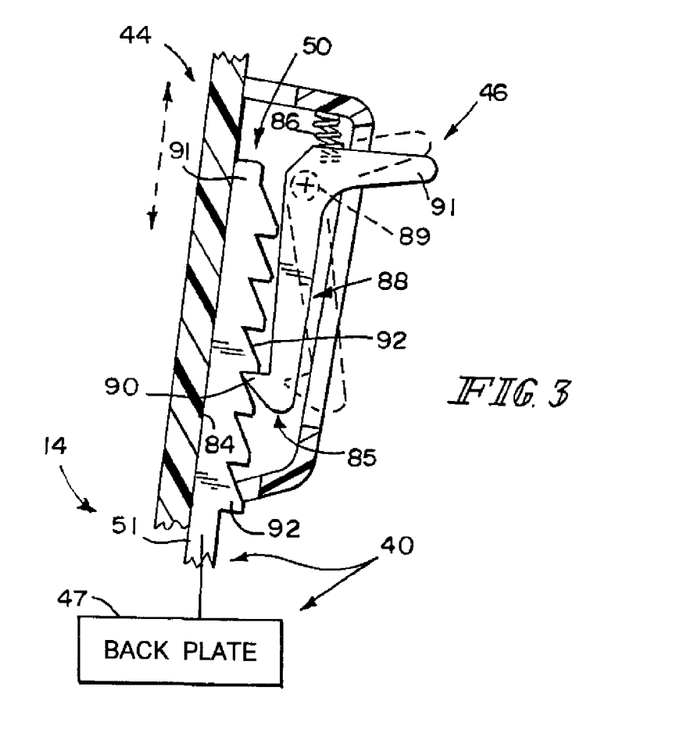
FIG. 3 is an enlarged sectional view taken along line 3-3 of FIG. 1 showing a headrest support including ratchet teeth coupled to a support plate extending upwardly from a back plate included in the foldable backrest and showing placement of the headrest support in a space between the movable headrest and a headrest-height adjustor mounted on the movable headrest to move therewith relative to the headrest support of the foldable backrest and configured to include a spring-biased pivotable height-adjustment latch.
Figure 4:
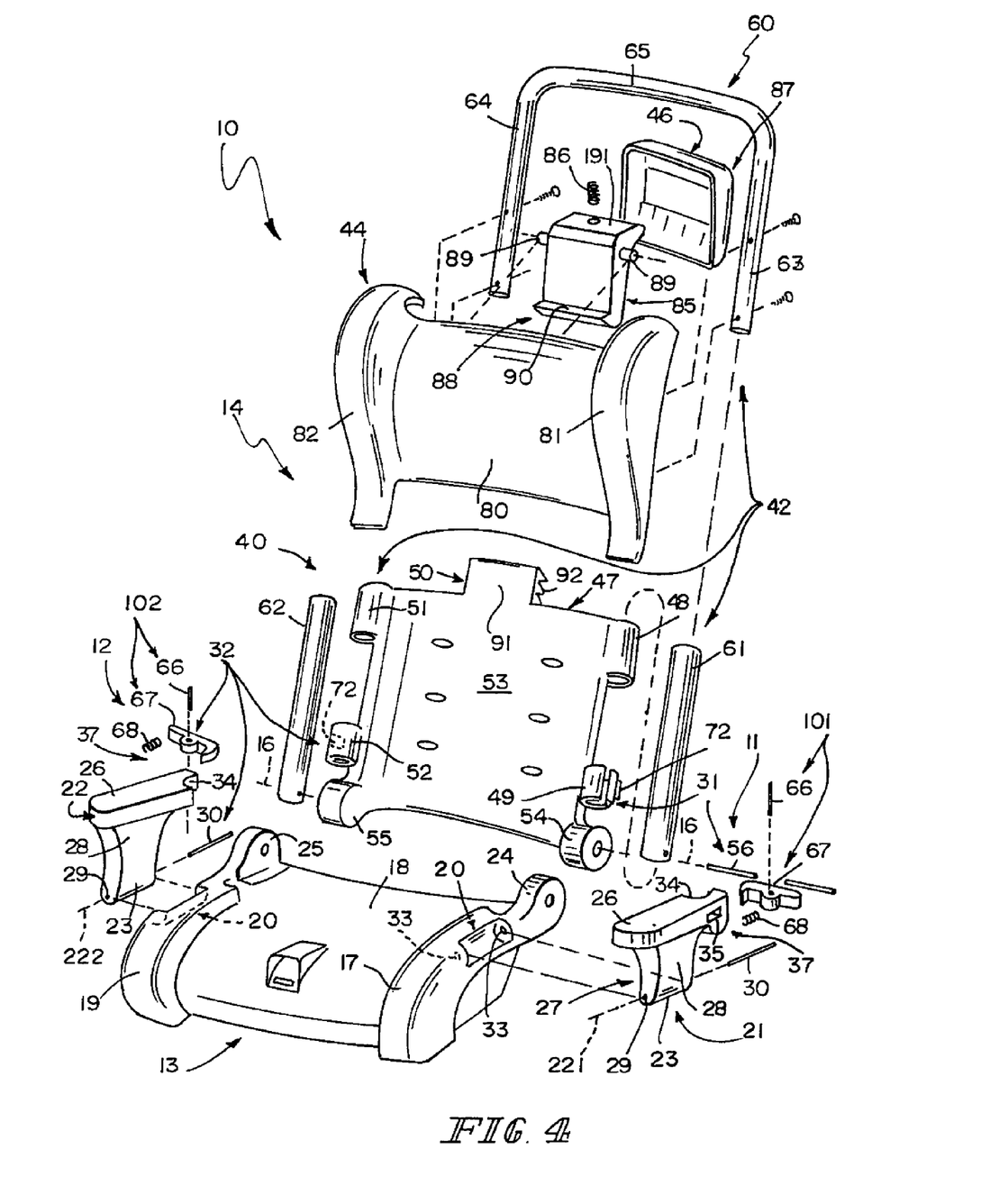
Figures 5, 6, 7:
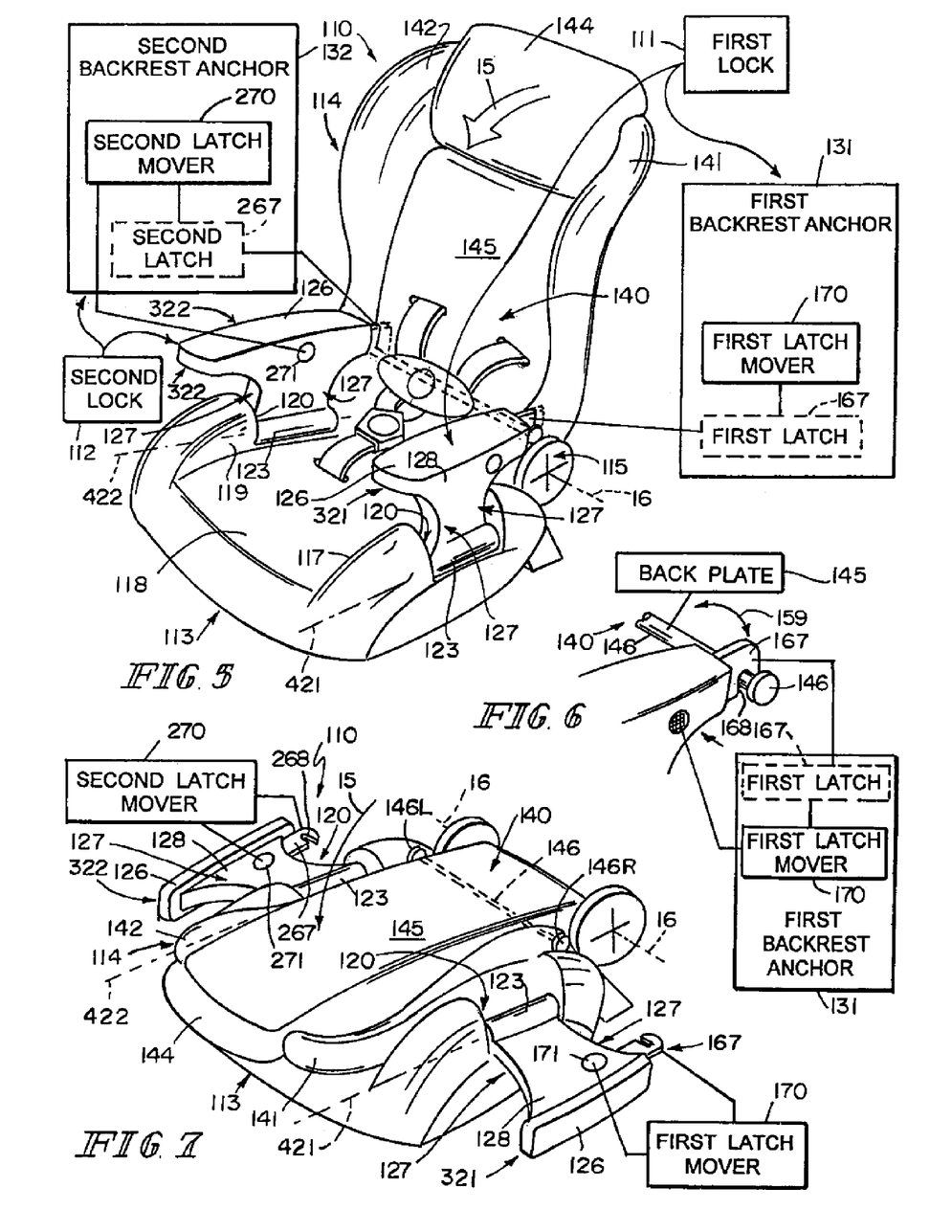
FIG. 5 is a perspective view of a juvenile vehicle seat in accordance with a second embodiment of the present disclosure including a seat back having a foldable backrest, first and second armrests mounted on a seat base and arranged to lie in upright backrest-blocking positions providing a barrier to forward folding movement of the foldable backrest toward a seat bottom included in the seat base and showing diagrammatically inclusion in the juvenile vehicle seat of a first backrest lock comprising the first armrest and a first backrest anchor and a second backrest lock comprising the second armrest and a second backrest anchor.
FIG. 6 is an enlarged partial perspective and diagrammatic view of the pivotable first armrest, a back plate included in the foldable backrest of FIG. 5, and a latch retainer included in the first backrest anchor and coupled to the back plate and suggesting that the first backrest anchor also includes a first latch configured to engage the latch retainer to retain the foldable backrest in the upright use position shown in FIG. 5 and a first latch mover configured to provide means for moving the first latch relative to the first armrest and to the latch retainer between latch-engaging and latch-disengaging positions to control locking and unlocking of the foldable backrest.
FIG. 7 is a perspective view similar to FIG. 5 showing the foldable backrest in a compact folded storage position lying on a seat bottom included in the seat base after a caregiver has, in sequence, used the first and second latch movers to disengage the latches from the latch retainer, pivoted the first and second armrests away from the seat bottom in opposite directions to assume retracted and lowered backrest-releasing positions, and pivoted the foldable backrest in a counterclockwise direction about a pivot axis established by a pivot rod arranged to lie behind and in spaced-apart relation to the latch retainer toward a top seating surface of the seat bottom.
Figures 8, 9:
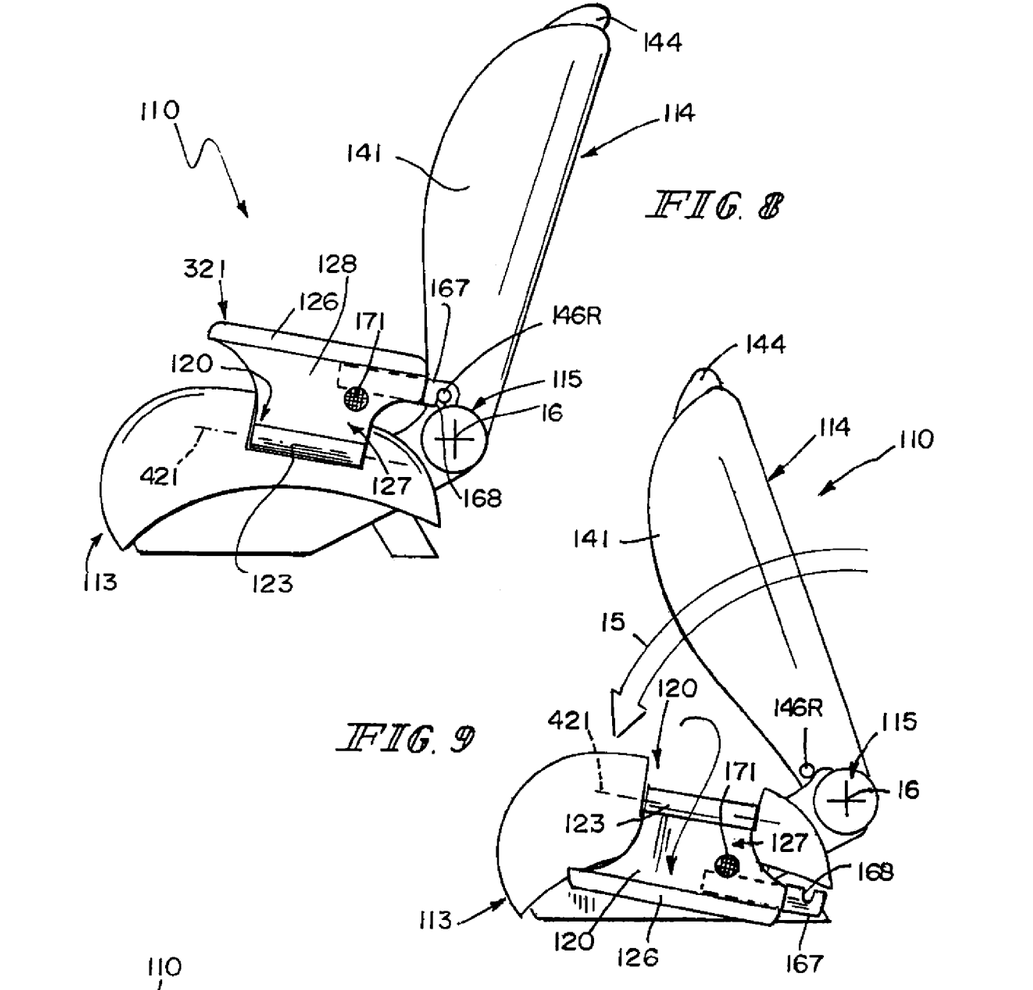
FIG. 8 is a side elevation view of the juvenile vehicle seat of FIG. 5 when the foldable backrest seat back is retained in the upright use position and showing mating engagement of the first latch included in the first backrest anchor with the anchor rod included in the first backrest anchor and coupled to the foldable backrest.
FIG. 9 is a side elevation view similar to FIG. 8 showing forward pivoting motion of the foldable backrest after disengagement of the first latch and the latch retainer and after outward and downward pivoting motion of the first and second armrests to assume their retracted and lowered backrest-releasing positions.
Figure 10:
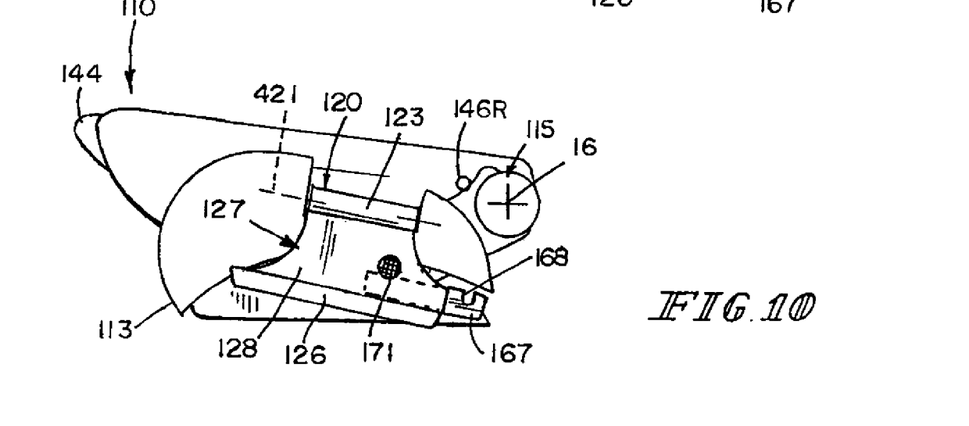
FIG. 10 is a side elevation view similar to FIGS. 8 and 9 showing the foldable backrest in the compact folded storage position shown in FIG. 7 and showing one end of the latch retainer located next to a portion of the seat base.

A first compactible juvenile vehicle seat 10 is suggested in FIGS. 1-4 while a second compactible juvenile vehicle seat 110 is suggested in FIGS. 5-10. In each embodiment, retractable armrests (21, 22 and 321, 322) are included and used to block forward folding movement of a foldable backrest (40 and 140) about a pivot axis 16 toward a compact folded storage position on a stationary seat base. Also, backrest anchors (31, 32 and 131, 132) are provided and used to retain the armrests in upright backrest-blocking positions as shown in FIGS. 1 and 5 at the option of a caregiver. Folding movement of the backrest relative to a seat base is possible as shown in FIGS. 1A and 7 after the backrest anchors have been disabled and the armrests have been retracted.

A compactible juvenile vehicle seat 10 in accordance with a first embodiment of the present disclosure includes a seat base 13, a seat back 14, and pivotable first and second armrests 21, 22 as suggested in FIG. 1. Seat back 14 includes a foldable backrest 40 coupled to seat base 13 at a pivot axis 16 using any suitable axle 15.

Foldable backrest 40 is retained normally in an upright use position as shown in FIG. 1 by a first backrest lock 11 including first armrest 21 and a first backrest anchor 31 and by a second backrest lock 12 including second armrest 22 and a second backrest anchor 32. Foldable backrest 40 can fold in forward direction 15 about a pivot axis 16 toward seat base 13 to assume a compact folded storage position (shown in FIG. 1A) on seat base 13 in response to (1) release of first and second backrest anchors 31, 32 to free first and second armrests 21, 22 for pivotable movement and (2) pivoting movement of first and second armrests 21, 22 away from one another (in the direction of double arrows 121, 122) to remove backrest-folding barriers established by first and second armrests 21, 22 in their upright orientations.

As suggested in FIGS. 1 and 4, seat base 13 is formed to include a seat bottom 18 adapted to seat a juvenile (not shown) thereon and located between two spaced-apart thigh-support rims 17, 19. Each rim 17, 19 is formed to include an arm-receiver channel 20 sized to receive a lower end 23 of a companion armrest 21 or 22 therein and to allow movement of such companion armrest relative to seat base 13 in direction 121 or 122 between an upright backrest-blocking position shown, for example, in FIG. 1 and retracted and lowered backrest-releasing positions away from seat bottom 18 as suggested in FIG. 1 and shown in FIG. 1A.

Seat base 13 further includes first and second backrest mounts 24, 25 located near a rear edge of seat bottom 18 and arranged so that first backrest mount 24 is associated with and located near first thigh-support rim 17 and second backrest mount 25 is associated with and located near second thigh-support rim 19 as suggested in FIG. 4. First and second backrest mounts 24, 25 are configured to mate with companion portions (e.g., pivot blocks 54, 55) of foldable backrest 40 along pivot axis 16 as suggested in FIGS. 1 and 4 to facilitate folding movement of backrest 40 relative to seat base 13.

As shown in FIG. 4, first armrest 21 includes an arm support pad 26, a pad base 27 arranged to extend downwardly away from pad 26, and an arm pivot rod 30. Arm support pad 26, pad base 27, and arm pivot rod 30 cooperate to define a movable frame that is configured to pivot about a pivot axis established by arm pivot rod 30 during movement of first armrest 21 between the upright backrest-blocking position and the retracted backrest-releasing position.

Pad base 27 includes a distal upper end 28 coupled to an underside of pad 26 and a proximal lower end 23 sized to fit into and move in arm-receiver channel 20 formed in seat base 13 as suggested in FIGS. 1 and 4. Lower end 23 is formed to include a rod-receiving channel 29 sized to receive an arm pivot rod 30 therein. Arm pivot rod 30 is also configured to extend into rod-receiver apertures 33 formed in seat base 13 and opening into arm-receiver channel 20 to mate with seat base 13 and first armrest 21 to establish a first pivot axis 221 about which first armrest 21 may pivot as it moves relative to seat base 13 in direction 121 from an upright backrest-blocking position shown in FIG. 1 to a retracted and lowered backrest-releasing position away from seat bottom 18 as shown in FIG. 1A. Second armrest 22 is similar in shape, components, and function to first armrest 21 and is mounted to pivot about second pivot axis 222.

Figure 2:
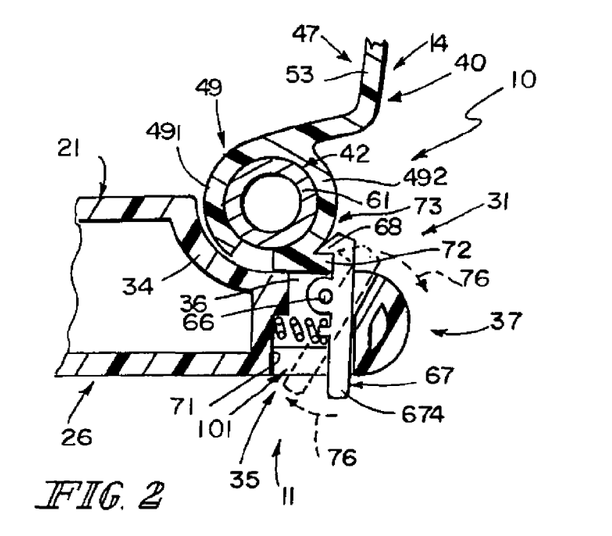
FIG. 2A is an enlarged view of the pivot post, pivotable latch, and a portion of the latch-biasing spring included in the first backrest anchor and showing that the latch includes, in sequence, from top to bottom, an inner segment providing a catch, a middle segment providing a post mount, an outer segment providing a spring mount, and an actuator-arm segment providing an exposed portion of the latch to be gripped by a user desiring to pivot the latch to free the foldable backrest for forward folding movement toward the seat bottom of the seat base.

As suggested in FIGS. 1, 2, and 4, arm support pad 26 of each armrest 21, 22 is formed to include a rearwardly facing, concave, curved backrest-blocker wall 34. Each armrest 21, 22 also includes an anchor mount 37 coupled to a rear portion of each arm support pad 26 is also formed to include an interior channel 35 having a floor 36 and receiving portions of first backrest anchor 31 therein as shown best, in the case of first armrest 21, in FIG. 2.

As shown best in FIG. 4, seat back 14 includes foldable backrest 40, a movable backrest frame 42, a headrest 44, and a headrest-height adjustor 46. Foldable backrest 40 includes a back plate 47, a frame guide comprising first upper and lower frame-receiving collars 48, 49 coupled to one side of back plate 47 and second upper and lower frame-receiving collars 51, 52 coupled to an opposite side of back plate 47, and a headrest support 50 cantilevered to and arranged to extend upwardly from a top side of back plate 47 as suggested in FIG. 4.

Back plate 47 of foldable backrest 40 includes a back support wall 53, a first pivot block 54 coupled to a first lower corner of back support wall 54, and a second pivot block 55 coupled to a second lower corner of back support wall 53. A pivot rod 56 is provided as suggested in FIG. 4 and sized to extend along pivot axis 16 through rod-receiver apertures formed in first and second backrest mounts 24, 25 included in seat base 13 and first and second pivot blocks 54, 55 included in backrest 40 to support backrest 40 for pivotable movement relative to seat base 13 about pivot axis 16 whenever first and second armrests 21, 22 are unlocked and moved away from one another and from seat bottom 20 in directions 121, 122 toward their retracted and lowered positions.

Movable backrest frame 42 includes a first side leg 61, a second side leg 62, and a U-shaped style bar 60 as shown best in FIG. 4. Style bar 60 includes a first riser segment 63 having a lower end coupled to an upper end of first side leg 61 and a second riser segment 64 having a lower end coupled to an upper end of second side leg 62. Style bar 60 also includes a lateral segment 65 arranged to extend between and interconnect upper ends of first and second riser segments 63, 64 as suggested in FIGS. 1 and 4. Movable backrest frame 42 is coupled to foldable backrest 40 in the illustrated embodiment by passing first side leg 61 downwardly through passageways formed in first upper and lower frame-receiving collars 48, 49 and second side leg 62 downwardly through passageways formed in second upper and lower frame-receiving collars 51, 52 as suggested in FIG. 4. Movable backrest frame 42 thus is mounted for up-and-down sliding movement on foldable backrest 40 and for folding movement with backrest 40 about pivot axis 16 relative to seat base 13.

Figure 2A:
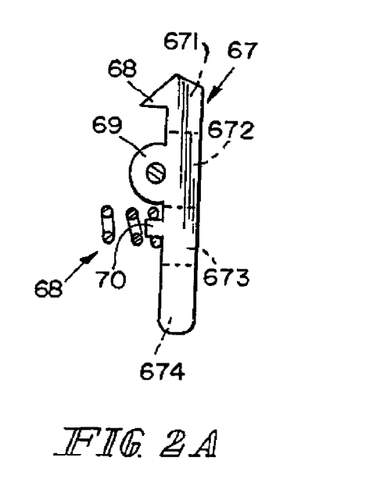

An illustrative embodiment of first backrest anchor 31 included in first backrest lock 11 is provided in FIGS. 2 and 2A. Second backrest anchor 32 included in second backrest lock 12 has a similar construction in an illustrative embodiment as suggested in FIG. 4.

First backrest anchor 31 includes a pivot post 66 coupled to arm support pad 26 of first armrest 21 and a latch 67 mounted for pivotable movement on pivot post 66 as suggested in FIG. 2 between a locked position (shown in solid) mating with, for example, a latch retainer 72 coupled to foldable backrest 40 and an unlocked position (shown in phantom) separating from latch retainer 72 coupled to foldable backrest 40. First backrest anchor 31 also includes a latch-biasing spring 68 coupled to first armrest 21 and latch 67 and constrained normally and yieldably to urge latch 67 to pivot on pivot post 66 to assume the locked position as shown in FIG. 2. In the illustrated embodiment, pivot post 66 is rooted on floor 36 of interior channel 35 formed in arm support pad 26. In an illustrative embodiment, juvenile vehicle seat 10 includes a first latch unit 101 comprising pivot post 66, pivotable latch 67, and latch-biasing spring 68 as suggested in FIGS. 2 and 4. Latch retainer 72 and first latch unit 101 cooperate to form first backrest anchor 31 in an illustrative embodiment as suggested in FIGS. 2 and 4.

As shown, for example, in FIG. 2A, pivotable latch 67 of first latch unit 101 is a monolithic element comprising, in series, an inner segment 671 providing a catch 68, a middle segment 672 providing a lever mount 69, an outer segment 673 providing a spring mount 70, and an actuator-arm segment 674 providing a free end of latch 67 configured to be gripped or touched easily by a user to facilitate pivoting of latch 67 about pivot post 66 to move pivotable latch 67 between its locked and unlocked positions. In one embodiment, inner, middle, and outer segments 671, 672, 673 cooperate to define a lever. As suggested in FIG. 2, one end of spring 68 engages an interior side wall 71 of arm support pad 26 bounding interior channel 35 and an opposite end of spring 68 receives a free end of spring mount 70 in a passageway formed in spring 68 and contacts a side edge of outer segment 673 of latch 67.

First backrest anchor 31 also includes a latch retainer 72 coupled to foldable backrest 40 and, illustratively, to first lower frame-receiver collar 49 of foldable backrest 40 as suggested in FIGS. 2 and 4. In an illustrative embodiment, latch retainer 72 cooperates with first lower frame-receiver collar 49 to form a latch receiver 73 sized to receive catch 68 of latch 67 therein upon movement of latch 67 to its locked position.

As shown in FIG. 2, first lower frame-receiver collar 49 comprises a semi-cylindrical forward flange 491 and a semi-cylindrical rearward flange 492. Latch retainer 72 is appended to a free end of rearward flange 492. Latch retainer 72 is arranged to extend away from forward flange 491 to define latch receiver 73 between latch retainer 72 and a curved exterior surface of rearward flange 492 as suggested in FIG. 2. As suggested in FIG. 4, second backrest anchor 32 also includes a similar latch retainer 72 that is coupled to second lower frame-receiver collar 52 and arranged to form a latch receiver (not shown) similar to latch receiver 73.

Once foldable backrest 40 is pivoted about pivot axis 16 to assume an upright use position relative to seat base 13, first armrest 21 can be pivoted about pivot axis 121 toward seat bottom 18 to assume an upright backrest-blocking position. In this upright backrest-blocking position, first armrest 21 is arranged to lie alongside or in confronting relation to foldable backrest 40 to cause concave, curved backrest-blocker wall 34 of arm support pad 26 to lie in closely confronting relation to a curved exterior surface of semi-cylindrical forward flange 491 of first lower frame-receiver collar 49 of foldable backrest 40 as shown, for example, in FIG. 2. Latch 67 is manipulated to mate catch 68 with its companion latch retainer 72 and, for example, to place catch 68 in latch receiver 73, to cause first lower frame-receiver collar 49 and a portion of first side leg 61 of movable backrest frame 42 located in the passageway formed in collar 49 to be trapped or otherwise retained in a space provided in first armrest 21 between backrest-blocker wall 34 and catch 68 of spring-biased latch 67. Foldable backrest 40 of seat back 14 is thus locked in an upright use position on seat base 13. (Second armrest 22 and second backrest anchor 32 cooperate to assist in retaining foldable backrest 40 in a locked upright use position in a similar manner.)

To release (or unlock) upright foldable backrest 40 of seat back 14 so that it can be folded in direction 15 to move from the upright use position shown in FIG. 1 toward seat bottom 18 to assume a compact folded storage position on seat bottom 18 shown in FIG. 1A, a user grips or touches actuator-arm segment 674 and pivots latch 67 of first backrest anchor 31 in counterclockwise direction 76 about pivot post 66 as suggested in phantom in FIG. 2 to disengage catch 68 of latch 67 from latch retainer 72. Now, first armrest 21 is no longer linked or tethered to foldable backrest 40 and the user may pivot first armrest 21 from its upright backrest-blocking position in direction 121 as suggested in FIG. 1 toward a retracted and lowered backrest-releasing position relative to seat bottom 18 of seat base 13 as shown in FIG. 1A. Pivotable latch 67 of second backrest anchor 32 is operated in a similar manner to untether second armrest 22 from foldable backrest 40 so that second armrest 22 can be moved to a retracted and lowered backrest-releasing position relative to seat bottom 18 of seat base 13 as shown, for example, in FIG. 1A.

Headrest 44 includes first and second side wings 81, 92 and a head pad 80 arranged to interconnect side wings 81, 82 as shown, for example, in FIGS. 1 and 4. Headrest-height adjustor 46 is coupled to a rearwardly facing surface 84 of head pad 80 as suggested in FIGS. 3 and 4.

Headrest-height adjustor 46 includes a retainer 85, a retainer-biasing spring 86, and a retainer cover 87 as shown, for example, in FIGS. 3 and 4. Retainer 85 includes a latch arm 88 formed to include pivot pins 89 at one end and a finger 90 at an opposite end. Retainer 85 also includes a hand grip 191 cantilevered to the end of latch arm 88 carrying pivot pins 89. Retainer 85 is mounted on retainer cover 87 using pivot pins 89 and is arranged to pivot toward and away from head pad 80 of headrest 44 when retainer cover 87 is mounted on rearwardly facing surface 84 of head pad 80 as suggested in FIG. 3.

To adjust the height or elevation of headrest 44 relative to foldable backrest 40, a user pivots retainer 85 about a pivot axis established by pivot pins 89 to compress spring 86 and disengage finger 90 on latch arm 88 from ratchet teeth 92 provided on a support plate 91 included in headrest support 50. Support plate 91 is arranged to extend upwardly from back plate 47 included in foldable backrest 40 as shown, for example, in FIGS. 3 and 4. Once finger 90 is disengaged from ratchet teeth 92 after movement of retainer 85 to a retracted position shown in phantom in FIG. 3, then a user may raise or lower headrest 44 relative to foldable backrest 40 as suggested by double arrows 94/95 shown in FIG. 1.

A juvenile vehicle seat 110 in accordance with a second embodiment of the present disclosure includes a seat base 113, seat back 114, and pivotable first and second armrests 321, 322 as suggested in FIGS. 5 and 7. Seat back 114 includes a foldable backrest 140 coupled to seat base 113 at a pivot axis 16 using any suitable axle 115.

Foldable seat back 114 is retained normally in an upright use position shown, for example, in FIG. 5, by a first backrest lock 111 including first armrest 321 and a first backrest anchor 131 and by a second backrest lock 112 including second armrest 322 and a second backrest anchor 132. Foldable backrest 140 can fold in forward direction 15 about a pivot axis 16 toward seat base 113 to assume a compact folded storage position shown, for example, in FIG. 7 in response to (1) release of first and second backrest anchors 131, 132 to free first and second armrests 321, 322 for pivotable movement and (2) pivoting movement of first and second armrest 321, 322 away from one another to remove backrest-folding barriers established by first and second armrests 321, 322 in their upright backrest-blocking orientations.

As suggested in FIGS. 5 and 7, seat base 113 is formed to include a seat bottom 118 adapted to seat a juvenile (not shown) thereon and located between two spaced-apart thigh-support rims 117, 119. Each rim 117, 119 is formed to include an arm-receiver channel 120 sized to receive a lower end 123 of a companion armrest 321 or 322 therein and to allow movement of such companion armrest relative to seat base 113 between an upright backrest-blocking position shown in FIG. 5 and retracted and lowered backrest-releasing positions away from seat bottom 118 shown in FIG. 7.

As shown in FIGS. 5 and 7, first armrest 321 includes an arm support pad 126 and a pad base 127 arranged to extend downwardly from pad 126 toward arm-receiver channel 120. Pad base 127 includes a distal upper end 128 coupled to an underside of pad 126 and a proximal lower end 123 sized to fit into and move in arm-receiver channel 120 formed in seat base 113 as suggested in FIGS. 5 and 7. An arm pivot rod (not shown) is coupled to lower end 123 of first armrest 121 to support first armrest 121 for pivoting movement relative to seat base 113 about pivot axis 421 as suggested in FIGS. 5 and 7. Likewise, another arm pivot rod (not shown) is coupled to lower end 123 of second armrest 122 to support second armrest 122 for pivoting movement relative to seat base 113 about pivot axis 422 as suggested in FIGS. 5 and 7. Second armrest 221 is similar in shape, components, and function to first armrest 121.

Seat back 114 includes foldable backrest 140, side wings 141, 142, and a headrest 144 as suggested in FIG. 5. In an illustrative embodiment, first backrest anchor 131 comprises first external portion 146R of a latch retainer 146 (shaped to resemble an elongated narrow-diameter rod in the illustrated embodiment), a first latch 167, and a first latch mover 170 as suggested in FIGS. 5-7. Latch retainer 146 is coupled to foldable backrest 140 to move therewith as suggested in FIG. 7-10. First latch 167 is formed to include a slot 168 sized to receive a portion of latch retainer 146 therein when first latch 167 is moved to mate with first external portion 146R of latch retainer 146 as suggested in FIG. 6. Similarly, second backrest anchor 132 comprises a second external portion 146L of latch retainer 146, second latch 267m and a second latch mover 270 as suggested in FIGS. 5 and 7. Second latch 267 is formed to include a slot 268 sized to receive second external portion 146L of latch retainer 146 therein when second latch 267 is moved to mate with latch retainer 146. First latch mover 170 is any suitable means for moving first latch 167 relative to first armrest 321 to engage and disengage latch retainer 146 by, for example, pivoting first latch 167 in up- and-down directions 159. In the illustrated embodiment, first latch mover 170 includes an exposed button 171, which button 171 may be pushed by a user to actuate latch mover 170 to cause first latch 167 to move relative to first armrest 321 to disengage latch retainer 146. A similar actuator button 271 is provided for second latch mover 270.

Foldable backrest 140 is locked in an upright use position as suggested in FIG. 5 whenever first and second armrests 321, 322 are pivoted or otherwise moved to assume their upright backrest-blocking positions and first and second latches 167, 267 are moved to engage latch retainer 146 mounted on foldable backrest 140 as suggested in FIG. 6. To release or unlock foldable backrest 140 so that it can be folded in direction 15 toward seat bottom 18 to assume a compact folded storage position as suggested in FIGS. 8-10, a user operates first and second latch movers 170, 270 to disengage first and second latches 167, 267 from latch retainer 146. Next, first and second armrests 321, 322 are moved away from one another to assume the retracted and lowered backrest-releasing positions shown in FIGS. 7, 9, and 10. Finally, now freed, foldable backrest 140 is pivoted about pivot axis 16 in direction 15 as suggested in FIG. 9 to assume the folded compact storage position shown in FIG. 10.

The invention claimed is:

1. A compactible juvenile vehicle seat comprising
a seat base adapted to set on a vehicle seat and formed to include a seat bottom adapted to support a juvenile in a seated position and an axle associated with the seat bottom,
a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom,
a first backrest lock configured to provide means for retaining the foldable backrest in the upright use position and for releasing the foldable backrest to free the foldable backrest so that, once freed, the foldable backrest can be pivoted about a pivot axis established by the axle to assume the compact folded storage position, wherein the first backrest lock includes a first armrest and a first backrest anchor, the first armrest is mounted to the seat base for movement relative to the seat bottom between an upright backrest-blocking position arranged to lie in confronting relation to the foldable backrest to block forward pivoting movement of the foldable backrest on the axle from the upright use position toward the seat bottom and a retracted backrest-releasing position to free the foldable backrest to pivot on the axle about the pivot axis between the upright use position and the compact folded storage position, and the first backrest anchor, includes a latch retainer coupled to the foldable backrest and latch means coupled to the first armrest for releasably mating with the latch retainer upon movement of the first armrest to the upright backrest-blocking position and the foldable backrest to the upright use position to retain the foldable backrest in the upright use position,
wherein the first armrest includes a backrest-blocker wall arranged to mate with a blocking portion of the foldable backrest upon movement of the foldable backrest to the upright use position and the first armrest to the upright backrest-blocking position to block forward folding movement of the foldable backrest from the upright use position toward the compact folded storage position,
wherein the blocking portion of the foldable backrest is curved and the backrest-blocker wall is a rearwardly facing, concave, curved surface, and
wherein the foldable backrest includes a back plate and a frame-receiving collar coupled to the back plate, the blocking portion is a tube arranged to extend through a tube-receiving passage defined by the frame-receiving collar, and the latch retainer is coupled to the frame-receiving collar and arranged to lie in spaced-apart relation to the back plate.

2. The compactible juvenile vehicle seat of claim 1, wherein the foldable backrest includes a front surface adapted to face toward a juvenile resting in the seated position on the seat bottom and an oppositely facing rear surface, the front surface is arranged to lie in confronting relation to the seat bottom upon movement of the foldable backrest to the compact folded storage position, and the latch retainer is arranged to lie in spaced-apart relation to an edge of the foldable backrest extending between the front surface and the oppositely facing rear surface.

3. A compactible juvenile vehicle seat comprising
a seat base adapted to set on a vehicle seat and formed to include a seat bottom adapted to support a juvenile in a seated position and an axle associated with the seat bottom,
a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom,
a first backrest lock configured to provide means for retaining the foldable backrest in the upright use position and for releasing the foldable backrest to free the foldable backrest so that, once freed, the foldable backrest can be pivoted about a pivot axis established by the axle to assume the compact folded storage position, wherein the first backrest lock includes a first armrest and a first backrest anchor, the first armrest is mounted to the seat base for movement relative to the seat bottom between an upright backrest-blocking position arranged to lie in confronting relation to the foldable backrest to block forward pivoting movement of the foldable backrest on the axle from the upright use position toward the seat bottom and a retracted backrest-releasing position to free the foldable backrest to pivot on the axle about the pivot axis between the upright use position and the compact folded storage position, and the first backrest anchor includes a latch retainer coupled to the foldable backrest and latch means coupled to the first armrest for releasable mating with the latch retainer upon movement of the first armrest to the upright backrest-blocking position and the foldable backrest to the upright use position to retain the foldable backrest in the upright use position,
wherein the first armrest includes a backrest-blocker wall arranged to mate with a blocking portion of the foldable backrest upon movement of the foldable backrest to the upright use position and the first armrest to the upright backrest-blocking position to block forward folding movement of the foldable backrest from the upright use position toward the compact folded storage position, and
wherein the latch means includes a pivot post coupled to the first armrest and a latch mounted for pivotable movement on the pivot post between a locked position mating with the latch retainer upon movement of the first armrest to the upright backrest-blocking position and the foldable backrest to the upright use position and an unlocked position separating from the latch retainer to release the foldable backrest for forward-folding movement toward the compact folded storage position after movement of the first armrest to the retracted backrest-blocking position.

4. The compactible juvenile vehicle seat of claim 3, wherein the first armrest further includes a movable frame configured to pivot about a pivot axis during movement of the first armrest between the upright backrest-blocking position and the retracted backrest-releasing position and an anchor mount coupled to a rear portion of the movable frame and arranged to lie in neighboring relation to the latch retainer upon movement of the foldable backrest to the upright use position and the first armrest to the upright backrest-blocking position and wherein the first backrest anchor is coupled to the anchor mount to move therewith.

5. The compactible juvenile vehicle seat of claim 4, wherein the movable frame includes a pad base having a lower end and a distal upper end, an arm pivot rod coupled to the lower end of the pad base and to the seat base to establish a pivot axis about which first armrest may pivot as the first armrest is moved between the upright backrest-blocking position and the retracted backrest-releasing position, and an arm support pad coupled to the distal upper end of the pad base and formed to include the backrest-blocker wall.

6. The compactible juvenile vehicle seat of claim 5, wherein the arm support pad has a front end and an opposite rear end, the backrest-blocker wall is included in the rear end, and the anchor mount is coupled to the rear end and arranged to extend away from the backrest-blocker wall.

7. The compactible juvenile vehicle seat of claim 3, wherein the latch means further includes a latch-biasing spring coupled to the first armrest and to the latch and constrained normally and yieldably to urge the latch on the pivot post to assume the locked position upon movement of the first armrest to the backrest-blocking position and the foldable backrest to the upright use position.

8. The compactible juvenile vehicle seat of claim 3, wherein the first armrest further includes a movable frame configured to pivot about a pivot axis during movement of the first armrest between the upright backrest-blocking position and the retracted backrest-releasing position and an anchor mount coupled to a rear portion of the movable frame and arranged to lie in neighboring relation to the latch retainer upon movement of the foldable backrest to the upright use position and the first armrest to the upright backrest-blocking position and wherein the first backrest anchor is coupled to the anchor mount to move therewith, and the pivot post is coupled to the anchor mount.

9. The compactible juvenile vehicle seat of claim 3, wherein the latch is a monolithic element including, in series, an inner segment providing a catch adapted to mate with the latch retainer, a middle segment providing a lever mount coupled to the pivot post, an outer segment providing a spring mount coupled to a latch-biasing spring also included in the latch means, and an actuator-arm segment providing a free end of the latch configured to be gripped easily by a user to facilitate pivoting of the latch about the pivot post to move the latch between the locked and unlocked positions.

10. The compactible juvenile vehicle seat of claim 9, wherein one end of the latch-biasing spring is located in an interior channel formed in the first armrest, one end of the latch-biasing spring engages an interior side wall bounding the interior channel, an opposite end of the latch-biasing spring receives a free end of the spring mount in a passageway formed in the latch-biasing spring and contacts a side edge of the outer segment of the latch, and each of the catch and the actuator-arm segment are arranged to lie outside of the interior channel.

11. The compactible juvenile vehicle seat of claim 3, wherein the seat base includes two spaced-apart thigh-support rims and a seat bottom located between the thigh-support rims and adapted to seat a juvenile thereon and a first of the thigh-support rims is formed to include a first arm-receiver channel, and a lower end of the first armrest is arranged to extend into the first arm-receiver channel and configured to mate with a first pivot rod included in the first armrest and located in the first arm-receiver channel and coupled to the first of the thigh-support rims, and the first pivot rod provides means for supporting the first armrest for pivotable movement about a pivot axis established by the first pivot rod during movement of the first armrest between the backrest-blocking and backrest-releasing positions.

12. The compactible juvenile vehicle seat of claim 11, wherein the first armrest further includes a pad base including the lower end and a distal upper end, an arm support pad coupled to the distal upper end of the pad base, and wherein the arm support pad includes a backrest-blocker wall arranged to mate with a blocking portion of the foldable backrest upon movement of the foldable backrest to the upright use position and the first armrest to the upright backrest-blocking position to block forward folding movement of the foldable backrest from the upright use position toward the compact folded storage position.

13. The compactible juvenile vehicle seat of claim 12, wherein the first armrest further includes an anchor mount coupled to the arm support pad and the first backrest anchor is coupled to the anchor mount.

14. The compactible juvenile vehicle seat of claim 13, wherein the arm support pad has a front end and an opposite rear end, the backrest-blocker wall is included in the rear end, and the anchor mount is coupled to the rear end of the arm support pad and arranged to extend away from the backrest-blocker wall.

15. The compactible juvenile vehicle seat of claim 12, wherein the first backrest anchor is coupled to the arm support pad to move therewith.

16. The compactible juvenile vehicle seat of claim 15, wherein the first backrest anchor includes a first latch and a first latch mover, the first latch is formed to include a slot sized to receive a portion of the latch retainer therein when the first latch is moved to mate with the latch retainer, and the first latch mover is configured to provide means for moving the first latch relative to the first armrest to engage and disengage the latch retainer so that the first armrest is retained in the backrest-blocking position when the foldable backrest lies in the upright use position.

17. The compactible juvenile vehicle seat of claim 3, wherein the first armrest includes an arm support pad formed to include a backrest-blocker wall arranged to mate with a blocking portion of the foldable backrest upon movement of the foldable backrest to the upright use position and the first armrest to the upright backrest-blocking position to block forward folding movement of the foldable backrest from the upright use position toward the compact folded storage position and an anchor mount coupled to the arm support pad and formed to include an interior channel receiving portions of the first backrest anchor therein.

18. A compactible juvenile vehicle seat comprising
a seat base adapted to set on a vehicle seat and formed to include a seat bottom adapted to support a juvenile in a seated position and an axle associated with the seat bottom,
a foldable backrest mounted on the axle for folding movement between an upright use position arranged to extend upwardly away from the seat bottom and adapted to support a juvenile in the seated position on the seat bottom and a compact folded storage position arranged to extend along the seat bottom and lie in confronting relation to the seat bottom,
a first backrest lock configured to provide means for retaining the foldable backrest in the upright use position and for releasing the foldable backrest to free the foldable backrest so that once freed, the foldable backrest can be pivoted about a pivot axis established by the axle to assume the compact folded storage position, wherein the first backrest lock includes a first armrest and a first backrest anchor, the first armrest is mounted to the seat base for movement relative to the seat bottom between an upright backrest-blocking position arranged to lie in confronting relation to the foldable backrest to block forward pivoting movement of the foldable backrest on the axle from the upright use position toward the seat bottom and a retracted backrest-releasing position to free the foldable backrest to pivot on the axle about the pivot axis between the upright use position and the compact folded storage position, and the first backrest anchor includes a latch retainer coupled to the foldable backrest and latch means coupled to the first armrest for releasably mating with the latch retainer upon movement of the first armrest to the upright backrest-blocking position and the foldable backrest to the upright use position to retain the foldable backrest in the upright use position, and wherein the foldable backrest includes a back plate, a frame-receiving collar coupled to the back plate, and a backrest frame extending through a passageway formed in the frame-receiving collar, and the latch retainer is coupled to the frame-receiving collar.

* * * * *